Patented Dec. 25, 1945

2,391,827

UNITED STATES PATENT OFFICE 2,391,827

PRODUCTION OF CHLOROPRENE BY PYROLYSIS

George W. Hearne, Berkeley, and Merrill L. Adams, Lafayette, Calif., assignors to Shell Development Company, San Francisco, Calif., a corporation of Delaware No Drawing. Original application December 18, 1939, Serial No. 309,848. Divided and this application July 23, 1941, Serial No. 403,764

12 Claims. (Cl. 260—655)

The invention relates to a process for the production of chloroprene, and has particular reference to a novel process for producing chloroprene from certain polychlorinated unsaturated aliphatic hydrocarbons having four carbon atoms per molecule.

As is well known, chloroprene (2-chlorbutadiene-1,3) is a highly valuable intermediary. It may be polymerized in the presence of light, heat, ozone, polymerization catalysts or other polymerizing influences to an elastic rubber-like product, or it may be converted under suitable conditions to plastic polymers resembling unvulcanized rubber. Also, chloroprene may be polymerized in the emulsified state to form a product similar to natural rubber latex. Furthermore, it is known that the polymerization may be carried out (with attendant alteration in the nature of the resulting products) in the presence of solvents, or in the presence of certain inhibitors of polymerization, or in the presence of sulfur, thiuram disulfides, and the like.

In view of the fact that the artificial rubber produced by the polymerization of chloroprene is superior, at least in some respects, to ordinary rubber, as for instance in its insolubility in hydrocarbons, such as petroleum products, there is a constant demand for chloroprene. One of the known methods of preparing chloroprene is by the addition of hydrogen chloride to monovinyl acetylene, the principal primary products thus obtained being chloroprene and 1-chlorbutadiene-2,3. This is disclosed in the Carothers and Collins patent (U. S. 1,950,431). Recently, it has been proposed to obtain chloroprene from butadiene by chlorinating it via addition to 1,2-dichlorbutene-3 and subjecting the resulting dichloride to a partial dehydrochlorination by the action of an alkali. The butadiene employed as the starting material may be produced by subjecting a normal dichlorbutane, such as 1,2-dichlorbutane or 2,3-dichlorbutane, to non-catalytic, thermal, vapor-phase dehydrochlorination at temperatures of between about 560° C. and 770° C., such a method being disclosed and claimed in a co-pending application, Serial No. 246,666, filed December 19, 1938. As pointed out in said application, such pyrolytic dehydrochlorination, however, besides producing a considerable amount of butadiene, also yields a relatively substantial proportion of unsaturated monochlorides, such as 2-chlorobutene-2. This monochloride may be chlorinated in the liquid phase, under the influence of light and in the deliberate presence of small quantities of oxygen to yield substantial quantities of 2,3-dichlorbutene-1. This chlorination, predominantly via allylic substitution, is disclosed and claimed in a co-pending application, Serial No. 299,286, filed October 13, 1939.

It is one of the objects of the present invention to provide an efficient and economic process for converting the aforementioned dichloride into chloroprene. A further object of the invention is to provide a process for the economic conversion of certain other dichlorbutenes into chloroprene. Still other objects will be apparent from the following description of the process.

It has now been discovered that relatively high yields of chloroprene may be obtained by subjecting 2,3-dichlorbutene-1 to a non-catalytic thermal dehydrochlorination in the absence cf any basic material, the dehydrochlorination being effected in the vapor phase and at a temperature between about 450° C. and 650° C. It has been further discovered that chloroprene may be produced in substantial yields by subjecting 1,2-dichlorbutene-2, 1,3-dichlorbutene-2 and 3,3-dichlorbutene-1 to the aforementioned thermal dehydrochlorination. In this connection it must be noted that this discovery is not only unexpected but, at least in part, is contrary to certain beliefs maintained heretofore by those skilled in the art. For example, Klebanskii et al., Journ. Applied Chem. U. S. S. R., vol. 9, pp. 1985 et seq (1936), state that some chloroprene was obtained by subjecting 1,3-dichlorbutene-2 to catalytic dehydrochlorination at a temperature of 350° C. to 400° C. The article further states that non-catalytic heat treatment in an empty tube at temperatures below 300° C. to 350° C. effects some splitting off of hydrogen chloride without, however, producing even traces of the desired low boiling product (chloroprene). As to non-catalytic pyrolysis at temperatures of 400° C. to 450° C., it is stated that "there occurs a complete decomposition of the product down to an elementary carbon." As will be noted from the examples presented hereinbelow and contrary to the above, it has been discovered that excellent yields of chloroprene may be realized by subjecting 1,3-dichlobutene-2 as well as the other mentioned dichlorbutenes to thermal non-catalytic pyrolysis at temperatures of above about 450° C. and even above 500° C.

Not all dichlorbutenes can be converted to chloroprene by the thermal non-catalytic dehydrochlorination according to the present invention. Thus, as pointed out, only 2,3-dichlorbutene-1, 1,2-dichlorbutene-2, 1,3-dichlorbutene-2 and 3,3-dichlorbutene-1 may be dehydrochlorinated to chloroprene by subjecting these dichlorides to thermal, non-catalytic pyrolysis at temperatures of between about 450° C. and 650° C. An analysis of the structures of these unsaturated dichlorides shows that the two chlorine atoms of the first three dichlorides are in alpha and beta positions to the double bond. As to the 3,3-dichlorbutene-1, it appears that this dichloride rearranges under the influence of heat to the 1,3-dichlorbutene-2 in which the chlorine atoms are in the alpha and beta positions to the double bond. These four unsaturated dichlorides yield chloroprene (2-chlor-butadiene-1,3) when subjected to pyrolysis in accordance with the present invention. On the other hand when 1,2-dichlorbutene-3 or its isomer, 1,4-dichlorbutene-2 (produced by allylic rearrangement) is subjected to the non-catalytic thermal dehydrochlorination, the product is not chloroprene, but 1-chlorbutadiene-1,3. It is to be noted that these two unsaturated dichlorbutenes have the chlorine atoms in beta position with respect to the double bond. Another unsaturated dichloride which cannot be converted to chloroprene by thermal dehydrochlorination is the 2,3-dichlorbutene-2 which is stable probably due to the fact that its chlorine atoms are in the vinyl or alpha position with respect to the double bond.

It has been proposed to employ various processes for the removal of halogen acids from different halogen containing organic compounds, such as saturated and/or unsaturated hydrocarbons. Although some of these processes may be suitable for the dehydrochlorination of the unsaturated polychlorinated hydrocarbons enumerated hereinabove, such processes in some instances do no yield chloroprene while in other cases they are accompanied by so many disadvantages as to render their use uneconomical and/or cumbersome. For example, various processes involving the removal of halogen acid by means of basic agents have been proposed. These processes have the disadvantages of consuming considerable quantities of reagents and of precluding the recovery of the halogen acid. Also, in some instances the treatment with an alkali, instead of yielding the desired unsaturated monochlorinated diolefin, yields predominantly other less desirable products. For instance, the alkali treatment of 2,3-dichlorbutene-1, 1,2-dichlorbutene-2 and 1,3-dichlorbutene-2 produces an unsaturated chlorhydrin instead of chloroprene.

Another process employed until the present time involves the use of catalysts. This process to a certain degree overcomes the main disadvantages of the chemical dehydrochlorination by means of basic agents since it avoids the consumption of the basic reagent and permits the recovery of the hydrogen chloride. It has been invariably found, however, that in catalytic dehydrochlorination considerable polymerization to tars and decomposition to coke occur. As a consequence the catalysts deteriorate rapidly, even at the lowest operative temperatures, and must be frequently replaced or rejuvenated.

The process according to the present invention obviates all of the above defects and disadvantages, and provides an economical method for producing high yields of chloroprene from the enumerated dichlorbutenes. This process in its most simple aspect consists of passing the anhydrous vapors of the appropriate polyhalogenated compound through a non-catalytic reaction chamber maintained at a suitable temperature, and separately recovering the chloroprene and halogen acid from the effluent vapors. The invention may be further stated to reside in subjecting the vapors of dichlorbutenes having the chlorine atoms attached both in vinyl and allyl positions, i. e. dichlorbutenes having a chlorine atom on one of the unsaturated carbon atoms and a chlorine atom on one of the saturated carbon atoms (or dichlorbutenes which rearrange under the influence of heat into such isomers having a chlorine atom attached in alpha position and another chlorine atom in beta position with respect to the double bond) to suitable temperatures in the deliberate absence of catalysts and/or basic agents.

The process may be executed in conventional apparatus of widely varying design. One convenient method of executing the process which, in view of its simplicity is exceptionally suitable for large scale commercial production, consists in vaporizing the primary material either in a separate vaporizer or in the fore section of the reaction tube, passing the vapors continuously through an unpacked tube maintained at the desired temperature, and recovering the chloroprene and the hydrogen chloride from the effluent gases or vapors.

The dehydrochlorination reaction according to the present invention should be effected preferably at temperatures between about 450° C. and 650° C., excellent results having been realized at a reaction temperature of about 500° C. to 530° C. When the vapors of any of the above described polyhalogenated compounds are passed through the reaction tube maintained at a sufficiently high dehydrochlorinating temperature the dehydrochlorination takes place to a greater or lesser extent depending upon the severity of the prevailing conditions, i. e., the temperature and the length of time allowed for reaction. Therefore, the temperature and reaction time may be most conveniently expressed in terms of the amount of dehydrochlorination taking place. The extent to which the primary material is dehydrochlorinated (the percent of material reacted) may be expressed as percent "conversion." Although the present process may be operated using high percent conversions, it has been found that it is preferable to operate under conditions which would result in relatively lower conversions per passage of the primary material through the reaction zone. This is due to the fact that under such conditions the reaction products will contain only very small amounts of vinyl acetylene as well as of products of complete decomposition of the primary material. Also, the use of the less rigorous operating conditions decreases the formation of products of polymerization. As shown in the examples, it is usually advantageous to operate under conditions which will effect a conversion of between about 40% and 60% as calculated on the amount of primary material conveyed through the reaction zone. However, in some cases it may be preferable to regulate the operating conditions to obtain greater per pass conversion rates. At any rate, the operating temperature, other conditions being constant, should be below that at which substantial decomposition to tar and/or carbon occurs.

Since only a portion of the polychlorinated material is dehydrochlorinated to chloroprene during a single passage of the primary material through the reaction zone, the unreacted material may be recycled. Such recycling may be employed in connection with either batch, semicontinuous or continuous dehydrochlorinations according to the present invention. In the case of a continuous treatment of the primary material, the polyhalide may be vaporized and conveyed in a vapor phase through an empty reaction tube maintained at the desired or optimum temperature, the rate of throughput being controlled to effect the desired conversion rate. The effluent vapors may then be cooled so as to condense the unreacted material which is then recycled back continuously or otherwise for re-evaporation and passage through the reaction zone. Obviously, additional quantities of primary material may be introduced into the evaporator either periodically or continuously. The chloroprene and the hydrogen chloride may be recovered from the vapors remaining after the condensation of the unreacted material, this recovery being effected by any of the well-known means, such as chilling and stratification, etc.

Although the dehydrochlorination reaction may be effected at atmospheric pressure, it is also possible to employ superatmospheric or reduced pressures. In fact, in some cases it may even be advisable to realize the reaction at reduced pressures since it reduces the yield of chloroprene polymers and of chlorine-free unsaturated polymers. The thermal, non-catalytic vapor-phase dehydrochlorination according to the present invention may also be effected in the presence of inert diluents, such as nitrogen or helium, the use of which allows the realization of the reaction under more rigorous operating conditions without the concurrent polymerization of the reaction products and/or carbonization of the primary material.

The following examples which are not to be construed as limitative are submitted to illustrate the production of chloroprene according to the present process:

*Example I*

2,3-dichlorbutene-1 was continuously introduced into a vaporizer, and the vapors conveyed at a rate of about 5 cc. per minute through a quartz reaction tube having an internal diameter of 1.9 centimeters and a length of 56 centimeters. The tube was maintained at a temperature of 530° C. The effluent vapors leaving the reactor were continuously fractionated to recover separately the produced chloroprene and hydrogen chloride, the condensed unchanged dichloride being returned back to the vaporizer for commingling with fresh quantities of 2,3-dichlorbutene-1. The volumetric ratio of recirculated dichloride to fresh material was maintained at about 1.21:1. An analysis of the reaction products showed the following yields as based on the dichloride consumed:

| | Per cent |
|---|---|
| Vinyl acetylene | 0.7 |
| Chloroprene | 56.7 |
| Chloroprene polymer | 17.7 |
| Chlorine-free polymer | 10.6 |
| Loss | 10.9 |

While the analyzed yield of chloroprene is only 56.7%, the actual yield of this product is somewhat higher. In the first place, it was noticed that some polymerization occurred while the reaction products were analyzed. Furthermore, the yield of the polymerized by-products may be decreased by more efficient operations which would completely separate the chloroprene from the recycled material. This may be accomplished by using lower temperatures and pressures. Also, efficient recovery systems would increase the actual chloroprene yield by decreasing the losses.

*Example II*

1,2-dichlorbutene-2 (B. P. 130–131° C.) was vaporized and conveyed at a rate of 3.0 cc./min. through the unpacked reaction tube employed in the first example, this reactor being maintained at a temperature of 533° C. The yield of chloroprene was 35.7 mol. per cent based on the dichlorbutene consumed. About 14.3% of the employed 1,2-dichlorbutene-2 was allylically rearranged to 2,3-dichlorbutene-1 (B. P. 111.8° C.).

*Example III*

1,3-dichlorbutene-2, having a boiling point in the neighborhood of 128° C. to 129° C., was vaporized and the vapors were conveyed at a rate of 3.3 cc./min. through the above-described reactor maintained at a temperature of 532° C. An analysis of the reaction products showed that the yield of chloroprene was above 40.0 mol. per cent, based on the dichloride consumed, there being a considerable loss of products (about 16.3 mol. per cent) due to inefficient methods of recovery.

Although the present invention has been described in connection with the thermal, non-catalytic decomposition in open or unpacked tubes, it is also possible to employ reaction tubes which contain packing or baffles which will prevent localized or uneven dehydrohalogenation particularly when the pyrolysis is effected on a large scale and, therefore, in relatively large reaction tubes. Also, it is frequently advantageous to employ diluents which will dilute the primary material and the reaction products, thereby preventing or at least inhibiting some of the side reactions, as for example the polymerization of the formed chloroprene. As diluents, it is possible to use nitrogen, helium, etc., which do not react with the primary material and/or reaction product at the operating conditions.

This application is a division of the co-pending application, Serial No. 309,848, filed December 18, 1939.

We claim as our invention:

1. A process for the production of chloroprene from 2,3-dichlorbutene-1 which comprises subjecting substantially anhydrous vapors of the dichlorbutene to thermal dehydrochlorination in the absence of a basic agent and of a catalyst at a temperature of about 530° C., and separately recovering chloroprene and anhydrous hydrogen chloride from the resulting mixture.

2. A process for the production of chloroprene from 2,3-dichlorbutene-1 which comprises subjecting vapors of the dichlorbutene to thermal dehydrochlorination in the absence of a basic agent and of a catalyst at a temperature of about 530° C., and recovering chloroprene from the resulting mixture.

3. A process for the production of chloroprene from 2,3-dichlorbutene-1 which comprises subjecting substantially anhydrous vapors of the dichlorbutene to thermal dehydrochlorination in the absence of a basic agent and of a catalyst at a temperature between about 450° C. and about 650° C., and recovering chloroprene from the resulting mixture.

4. A process for the production of chloroprene from 2,3-dichlorbutene-1 which comprises subjecting vapors of the dichlorbutene to thermal dehydrochlorination in the absence of a basic agent and of a catalyst at a temperature between about 450° C. and about 650° C., and recovering chloroprene from the resulting mixture.

5. A process for the production of chloroprene which comprises subjecting vapors of a dichlorbutene having a chlorine atom on one of the unsaturated carbon atoms and a chlorine atom on one of the saturated carbon atoms, to thermal dehydrochlorination in the absence of a basic agent and of a catalyst at a temperature between about 450° C. and about 650° C., and recovering chloroprene from the resulting mixture.

6. A process for the production of chloroprene which comprises subjecting substantially anhydrous vapors of a compound selected from the group consisting of 2,3-dichlorbutene-1, 1,2-dichlorbutene-2, 1,3-dichlorbutene-2 and 3,3-dichlorbutene-1 to thermal dehydrochlorination in the absence of a basic agent and of a catalyst at a temperature between about 450° C. and about 650° C., and recovering chloroprene and hydrogen chloride from the resulting mixture.

7. A process for the production of chloroprene which comprises subjecting vapors of a substance selected from the group consisting of 2,3-dichlorbutene-1, 1,2-dichlorbutene-2, 1,3-dichlorbutene-2, and 3,3-dichlorbutene-1 to thermal dehydrochlorination in the absence of a basic agent and of a catalyst at a temperature between about 450° C. and about 650° C., and recovering chloroprene from the resulting mixture.

8. In a continuous process of producing chloroprene, the steps of vaporizing a substantially anhydrous substance selected from the group consisting of 2,3-dichlorbutene-1, 1,2-dichlorbutene-2, 1,3-dichlorbutene-2 and 3,3-dichlorbutene-1, continuously subjecting said vapors to thermal dehydrochlorination in the absence of a basic agent and of a catalyst and at a temperature of between about 450° C. and about 650° C., recovering the chloroprene and hydrogen chloride thus formed, and recycling the heavier chlorinated hydrocarbons for further vapor-phase non-catalytic dehydrochlorination to produce additional quantities of chloroprene.

9. The process according to claim 8, wherein the chloroprene and hydrogen chloride are separated from the reaction mixture by fractional condensation of the chlorinated hydrocarbons boiling above chloroprene, and wherein the condensate is commingled with fresh quantities of the substance to be dehydrochlorinated and subjected to vaporization and thermal dehydrochlorination in the absence of a basic agent and of a catalyst to effect the formation of additional quantities of chloroprene.

10. A process for the production of chloroprene which comprises subjecting substantially anhydrous vapors of 2,3-dichlorbutene-1 to thermal dehydrochlorination in the absence of a basic agent and of a catalyst, at a temperature of about 530° C., and for a period of time sufficient to effect the conversion of between about 40% and about 60% of the dichlorbutene subjected to treatment, and recovering chloroprene from the resulting mixture.

11. A process for the production of chloroprene which comprises subjecting vapors of 2,3-dichlorbutene-1 to thermal dehydrochlorination in the absence of a basic agent and of a catalyst, at a temperature of between about 450° C. and about 650° C., and for a period of time sufficient to effect the conversion of between about 40% and about 60% of the dichlorbutene subjected to treatment, and recovering chloroprene from the resulting mixture.

12. A process for the production of chloroprene which comprises subjecting vapors of a dichlorbutene selected from the group consisting of 2,3-dichlorbutene-1, 1,2-dichlorbutene-2, 1,3-dichlorbutene-2 and 3,3-dichlorbutene-1 to thermal dehydrochlorination in the absence of a basic agent and of a catalyst, at a temperature between about 450° C. and about 650° C., and for a period of time sufficient to effect a conversion of between about 40% and about 60% of the dichlorbutene subjected to treatment, and recovering chloroprene from the resulting mixture.

GEORGE W. HEARNE.
MERRILL L. ADAMS.